US007965267B2

(12) United States Patent
Baek

(10) Patent No.: US 7,965,267 B2
(45) Date of Patent: Jun. 21, 2011

(54) LIQUID CRYSTAL DISPLAY AND DRIVING METHOD THEREOF

(75) Inventor: Heume Il Baek, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1067 days.

(21) Appl. No.: 10/669,715

(22) Filed: Sep. 25, 2003

(65) Prior Publication Data

US 2004/0113882 A1 Jun. 17, 2004

(30) Foreign Application Priority Data

Dec. 12, 2002 (KR) ........................ 10-2002-0079342

(51) Int. Cl.
*G09G 3/36* (2006.01)
*G09G 5/00* (2006.01)
*G09G 5/02* (2006.01)
*G09G 5/10* (2006.01)
*G06F 3/038* (2006.01)

(52) U.S. Cl. .......... 345/87; 345/204; 345/214; 345/690; 345/694

(58) Field of Classification Search .................... 345/98, 345/99, 100, 204, 500, 545, 87, 214, 690, 345/694
See application file for complete search history.

(56) References Cited

U.S. PATENT DOCUMENTS

| | | | | |
|---|---|---|---|---|
| 5,115,229 | A * | 5/1992 | Shalit | 345/2.2 |
| 5,608,864 | A * | 3/1997 | Bindlish et al. | 345/558 |
| 5,936,608 | A * | 8/1999 | Springer | 345/690 |
| 6,222,512 | B1 * | 4/2001 | Tajima et al. | 345/63 |
| 6,697,250 | B2 * | 2/2004 | Kuo | 361/681 |
| 6,748,323 | B2 * | 6/2004 | Lokshin et al. | 701/213 |
| 6,778,160 | B2 * | 8/2004 | Kubota et al. | 345/89 |
| 2005/0253825 | A1 * | 11/2005 | Kawamura et al. | 345/204 |

FOREIGN PATENT DOCUMENTS

JP 1998-487843 * 8/1998

* cited by examiner

*Primary Examiner* — Alexander S. Beck
(74) *Attorney, Agent, or Firm* — Morgan, Lewis & Bockius LLP

(57) ABSTRACT

A liquid crystal display including a liquid crystal display panel having a liquid crystal cell at each intersection area of gate lines and data lines, a video processor generating processed data to implement a brightness level at a specific area of the liquid crystal display panel that is different from a remaining area of the liquid crystal display panel, and a position designator designating the specific area of the liquid crystal display panel where the processed data is implemented.

10 Claims, 6 Drawing Sheets

<FIRST FIELD>

<SECOND FIELD>

<FIRST FIELD>

<SECOND FIELD>

<FRAME>

LIQUID CRYSTAL DISPLAY AND DRIVING METHOD THEREOF

This application claims the benefit of Korean Patent Application No. 2002-79342 filed on Dec. 12, 2002, which is hereby incorporated by reference.

BACKGROUND OF THE INVENTION

1. Field of the Invention

The present invention relates to a liquid crystal display, and more particularly to a liquid crystal display that is capable of emphasizing brightness in a specified area of a liquid crystal display panel and a driving method for emphasizing brightness in a specified area of a liquid crystal display panel.

2. Description of the Related Art

Generally, liquid crystal displays have the advantages of small size, light weight, thin profile and low power consumption. Accordingly, liquid crystal displays are used for notebook PCs, office automation equipment, audio/video equipment and other visual type equipment. In particular, an active matrix liquid crystal display panel is a liquid crystal display panel suitable for displaying motion picture. A thin film transistor (hereinafter, referred to as TFT) is used as a switching device in each pixel of an active matrix liquid crystal display panel.

FIG. 1 is a block diagram representing a liquid crystal display of the related art. As shown in FIG. 1, the related art liquid crystal display includes a Liquid Crystal Display (LCD) panel 6, a data driver 8 to supply data to data lines DL1 to DLn, a gate driver 10 to supply scan pulses to the gate line GL1 to GLm of the liquid crystal display panel 6, a timing controller 4 to control the data driver 8 and the gate driver 10, an interface part 2 to supply digital video data DATA and an H synchronization signal and a V synchronization signal. A computer system 12 supplies the digital video data to the interface part 2 of the liquid crystal display.

As discussed above, the computer system 12 is formed separately from the liquid crystal display. A graphic card (not shown) installed in the computer system 12 converts pixel data and synchronization signals inputted from the outside to be suitable for the resolution of the liquid crystal display panel 6. The graphic card then supplies the converted data and signals to the interface part 2 of the liquid crystal display.

Although not shown in FIG. 1, the interface part 2 of the liquid crystal display receives synchronization signals, such as data RGB DATA, input clocks DCLK, horizontal synchronization signals H, vertical synchronization signals V, data enable signals DE, etc., inputted from the computer system 12 such that the signals are inputted into the timing controller 4. A Low Voltage Differential Signal (LVDS) interface and a Transistor-Transistor Logic (TTL) interface are mainly used for transmitting the data and the synchronization signals from a drive system. Further, interface functions are integrated into one chip along with the timing controller 4.

The timing controller 4 generates gate control signals GDC using the synchronization signals from the interface part 2 to control the gate driver 10. Further, the timing controller 4 generates data control signals DDC to control the data driver 8 using the synchronization signals from the interface part 2. The timing controller 4 aligns the data from the interface part 2 to supply the aligned data to the data driver 8.

The gate driver 10 includes a shift register to sequentially generate scan pulses, such as gate high pulses, in response to the gate drive control signal GDC supplied from the timing controller 4. The gate driver 10 also includes a level shifter to shift the voltage of the scan pulses to an appropriate level suitable for driving liquid crystal cells Clc. Video data through the data line DL are supplied to the pixel electrode of the liquid crystal cell Clc by a TFT in response to the scan pulses.

The data driver 8 receives the data drive control signals DDC from the timing controller 4 together with red R, green G and blue B video data. The data driver 8 latches the red R, green G and blue B digital video data in synchronization with the data drive control signals DDC, and then corrects the latched data in accordance with the gamma voltage $V_\gamma$ generated from a gamma voltage generator (not shown). Then, the data driver 8 converts the corrected data into analog data to supply the converted data to the LCD panel by data lines DLn in a line-by-line fashion.

The liquid crystal display panel 6 has liquid crystal injected between two glass substrates, and the data lines DL1 to DLn and gate lines GL1 to GLm are formed to cross each other on the lower glass substrate thereof. A TFT formed at the intersection of the data lines DL1 to DLn and the gate lines GL1 to GLm switches the data from the data lines DLI to DLn to the liquid crystal cell Clc in response to scan pulses. To this end, the gate terminal of the TFT is connected to the gate line GL1 to GLm, the source terminal is connected to the data line DL1 to DLn, and the drain terminal is connected to a pixel electrode of the liquid crystal cell Clc.

The liquid crystal cell is a passive luminous device and controls the transmittance of the light supplied from a same backlight unit. A group of liquid crystal cells in a liquid crystal display panel are used to display a picture. The liquid crystal display panel has been intensively developed to increase brightness such that the average brightness of the liquid crystal display panel is far above the average brightness level of 100 nit of the Cathode Ray Tube (CRT). Thus, the liquid crystal display panel can make users feel tired because the display is too bright. This is because the liquid crystal display panel is unilaterally set to a high brightness corresponding to the display of a motion picture, a TV video or a high-resolution picture, which can require a brightness level greater than 300 nit. In other words, since the liquid crystal display panel has a high preset average brightness level to accommodate a high-resolution picture or moving video image, the LCD panel is too bright for still and/or low-resolution images, which can make users feel tired.

FIG. 2 is a diagram representing a high picture quality mode and a word mode simultaneously displayed on a related art liquid crystal display panel shown in FIG. 1. As shown in FIG. 2, 100~150 nit brightness level class is suitable to the user for the average brightness of a first mode area A, such as a word processing mode. A 300~400 nit brightness level class is suitable for the average brightness of a second mode area B, such as a TV video, motion picture or high quality picture mode. However, the brightness of the LCD panel used for a monitor is normally set to a 200~300 nit brightness level on average. Due to the 200~300 nit average brightness level typical used, there is a problem in that area A of the LCD panel is too bright for the first mode and area B of the LCD panel is too dark for the second mode.

The brightness level of an LCD panel can be controlled by adjusting a lamp drive frequency through an On-Screen Display (OSD) or by adjusting the gamma voltage inputted to the data driver. However, it is impossible to control the brightness level of the LCD panel in just a portion or a specified area of an LCD panel since the entire LCD panel receives light from the same backlight unit. In other words, it is impossible to have a first mode area having a brightness level of 100~150 nit together at the same time with a second mode area having a brightness level of 300~400 nit in a liquid crystal display panel of the related art.

SUMMARY OF THE INVENTION

Accordingly, the present invention is directed to an LCD device and method of driving thereof that substantially obviates one or more of the problems due to limitations and disadvantages of the related art.

An object of the present invention to provide a liquid crystal display having a brightness level in a specified area of a liquid crystal display panel that is different than the brightness level of the rest of the liquid crystal display panel, and a driving method thereof.

In order to achieve these and other objects of the invention, a liquid crystal display including a liquid crystal display panel having a liquid crystal cell at each intersection area of gate lines and data lines, a video processor generating processed data to implement a brightness level at a specific area of the liquid crystal display panel that is different from a remaining area of the liquid crystal display panel, and a position designator designating the specific area of the liquid crystal display panel where the processed data is implemented.

In another aspect, a liquid crystal display includes a liquid crystal display panel having a liquid crystal cell at each intersection area of gate lines and data lines, a computer for providing data and position data for a specific area of the liquid crystal display panel, a video processor for generating processed data for the specific area from the position data and the data such that the brightness level of the processed data for the specific area is different than the brightness level of the data, a timing controller realigning the data and the processed data, a data driver supplying the realigned data and the processed data to the data lines, and a gate driver supplying a scan pulse to the gate lines.

In another aspect, a driving method of a liquid crystal display, which is driven having one frame divided into first and second fields, includes the steps of implementing a first picture for a first field and implementing a second picture for a second field such that a brightness level in a specific area of the second picture has a different brightness level in accordance with a type of image displayed in a specific area of the liquid crystal display panel than a brightness level of the first picture.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENT

Reference will now be made in detail to the preferred embodiments of the present invention, examples of which are illustrated in the accompanying drawings.

Figure 1:
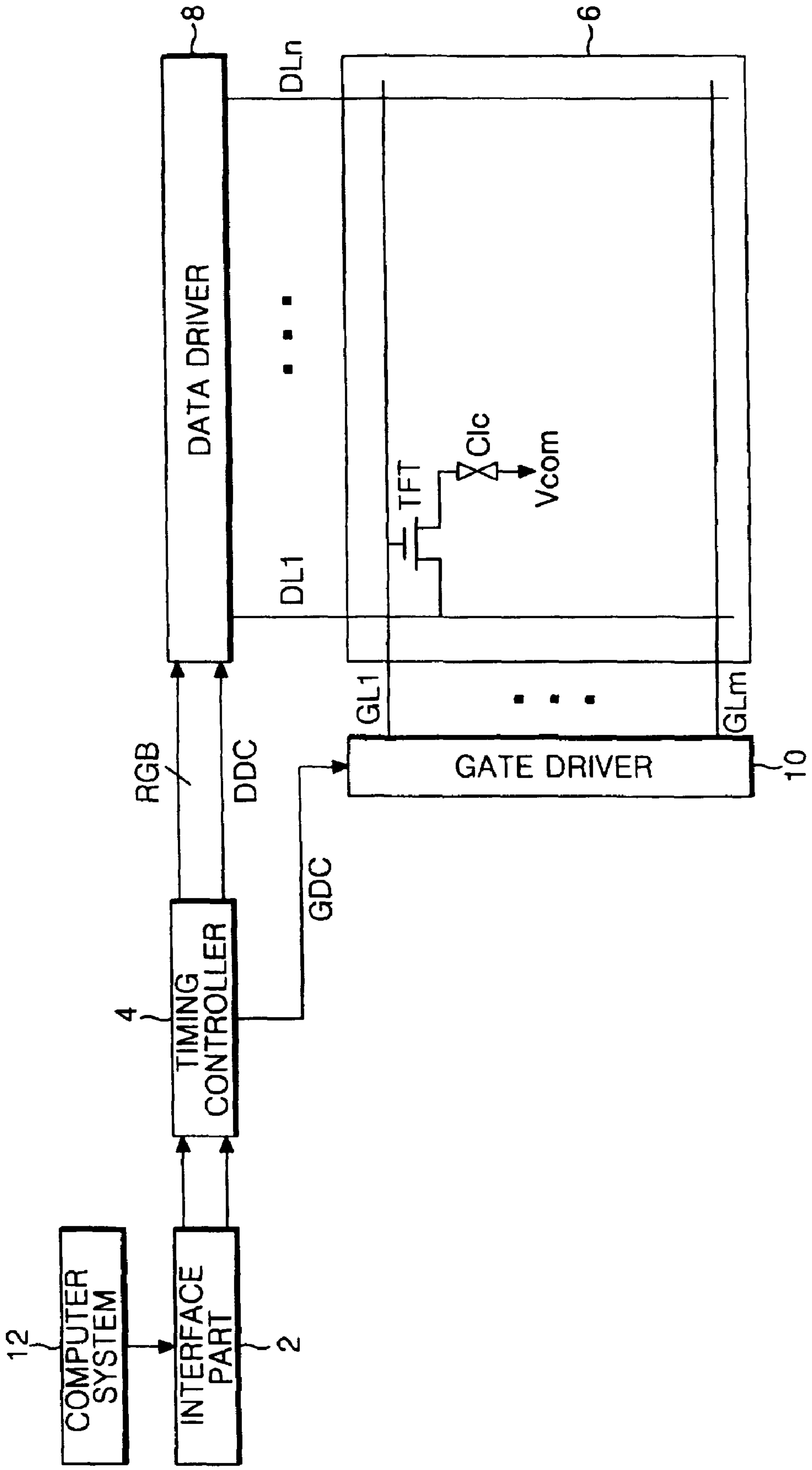
FIG. 1 RELATED ART
FIG. 1 is a block diagram representing a liquid crystal display of the related art.
Figure 2:
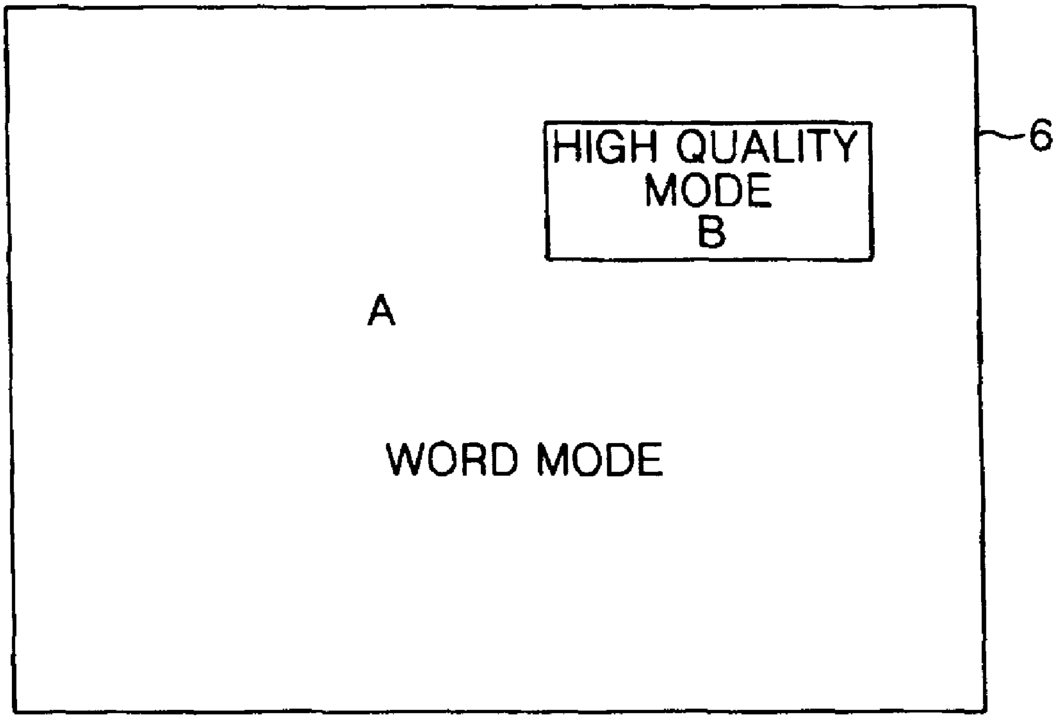
FIG.2 RELATED ART
FIG. 2 is a diagram representing a high picture quality mode and a word mode simultaneously displayed on a related art liquid crystal display panel shown in FIG. 1.
Figure 3:
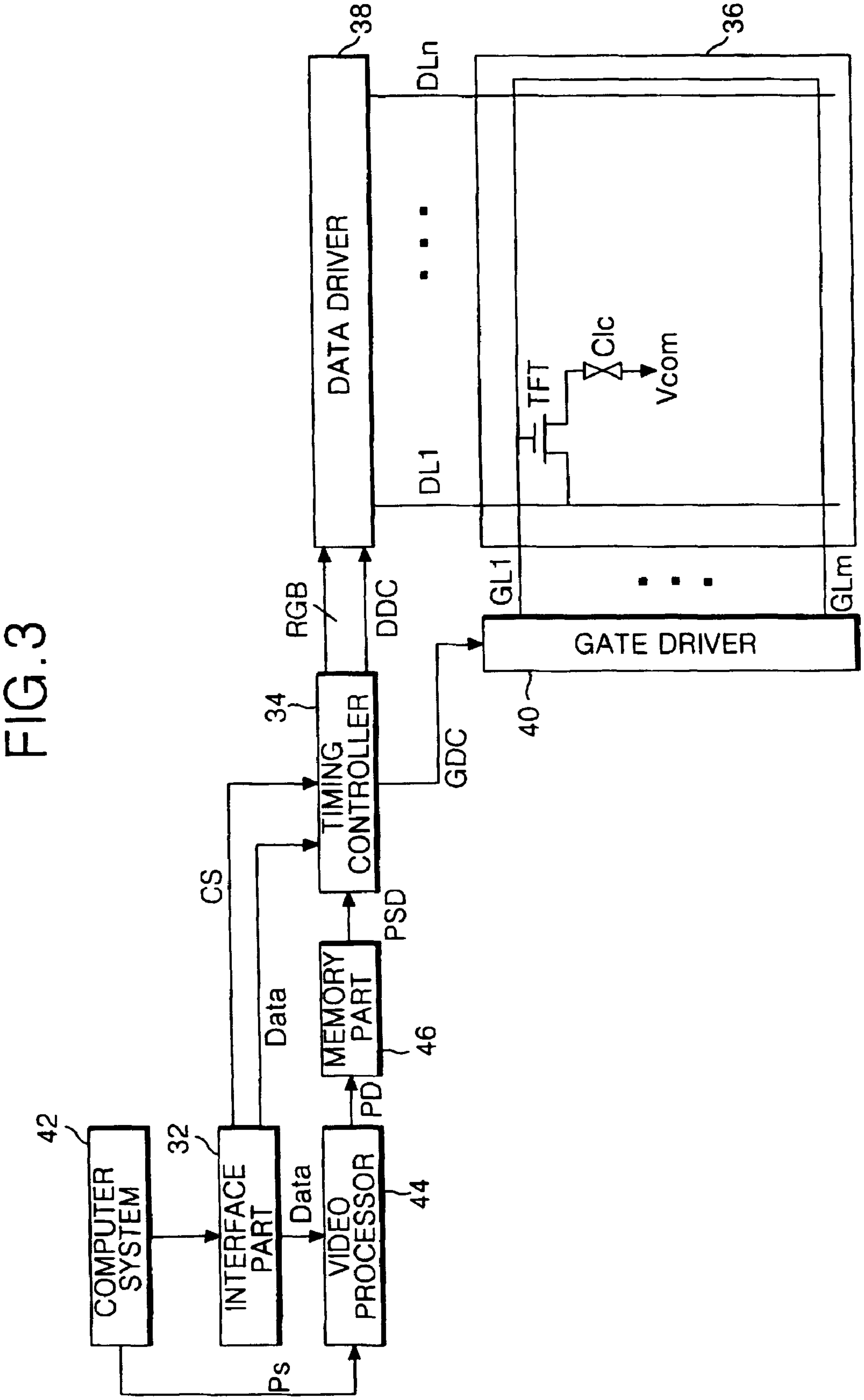
FIG. 3 is a block diagram representing a liquid crystal display according to the present invention.

FIG. 3 is a block diagram representing a liquid crystal display according to the present invention. As shown in FIG. 3, the liquid crystal display according to the present invention includes a liquid crystal display panel 36, a data driver 38 for supplying data to data lines DL1 to DLn of the liquid crystal display panel 36, a gate driver 40 for supplying scan pulses to the gate line GL1 to GLm of the liquid crystal display panel 36, a timing controller 34 to control the data driver 38 and the gate driver 40, an interface part 32 to supply digital video data DATA, synchronization signal H, and synchronization signal V. Further, a liquid crystal display according to the present invention includes computer system 42 that supplies the digital video data to the interface part 32. Furthermore, a video processor 44 and a memory part 46 are formed between the interface part 32 and the timing controller 34 of the liquid crystal display according to the present invention.

The computer system 42 converts pixel data and synchronization signals inputted from the outside to be suitable for the resolution of the liquid crystal display panel 36 and supplies the converted data and signals to the interface part 32. A scaler (not shown) located within the computer system 42 converts the digital signal adjusted in accordance with an On-Screen Display (OSD) offset adjustment value of the user to be suitable for the resolution of the liquid crystal display panel 36, and supplies the converted data and signals to the liquid crystal display panel. That is, the user can adjust the OSD offset adjustment value to select a low-speed mode, a high-speed mode or a high picture quality mode. Further, the computer system 42 automatically recognizes the location and size of an area to be specified having a higher brightness level by a set of coordinates from a program in the computer system 42. The computer system 42 supplies a position control signal PS, which corresponds to the set of coordinates, to the video processor 44.

The interface part 32 supplies a first data RGB DATA inputted from the computer system 42, such as a personal computer (not shown), to the video processor 44 and the timing controller 34. Further, the interface 32 receives control signals such as input clocks DCLK, horizontal synchronization signals H, vertical synchronization signals V, data enable signals DE, etc., inputted from the computer system 42 to supply the inputted signals to the video processor 44. A Low Voltage Differential Signal (LVDS) interface and a Transistor-Transistor Logic (TTL) interface are used for mainly transmitting the data and the control signals from the computer system 42. Further, interface functions are integrated into one chip along with the timing controller 34.

The video processor 44 receives the data DATA from the interface part 32, converts the data DATA of a corresponding field for the brightness to be displayed differently at a specific area of the liquid crystal display panel 36, and generates a processed data PD with the brightness level for the specific area. Herein, the specific area of the liquid crystal display panel 36 can be automatically designated by a position designator built into the computer system 42 or manually by the user.

Figure 4:
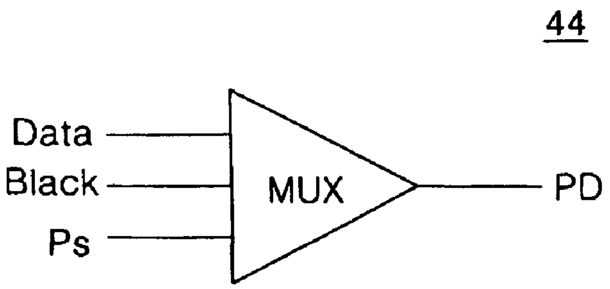
FIG. 4 is a diagram representing the video processor shown in FIG. 3.

FIG. 4 is a diagram representing the video processor shown in FIG. 3. As shown in FIG. 4, the video processor 44 can be implemented using a multiplexor MUX. The video processor 44 formed as a multiplexor MUX generates the processed data PD implemented at the specific area when the video processor 44 receives a position control signal PS, a black data BLACK and a data DATA. In other words, the processed data PD is for the picture displayed in the specified area.

The memory part 46 temporarily stores the data of one field implemented as black data, except for the specific area having a different brightness level. The processed data PD supplied from the video processor can be implemented in the specific area for emphasized brightness. The memory part 46 is formed of a frame memory that has a capacity to be able to store the data of the field having black data, except for the specific area having a different brightness level.

The timing controller 34 generates gate control signals GDC used with the synchronization signals from the interface part 32 to control the gate driver 40. Further, the timing controller 34 generates data control signals DDC to control the data driver 38. Furthermore, the timing controller 34 aligns the data from the interface part 32 and the processed data PD including the position control signal from the frame memory 46 to supply the aligned data to the data driver 38.

The gate driver 40 includes a shift register to sequentially generate scan pulses, such as gate high pulses, in response to the gate drive control signal GDC supplied from the timing controller 34. The gate driver 40 also includes a level shifter to shift the voltage of the scan pulses to an appropriate level suitable for driving liquid crystal cells Clc. Video data through the data line DL is supplied to the pixel electrode of a liquid crystal cell Clc by a TFT in response to the scan pulses.

The data driver 38 receives the dot clock DCLK from the timing controller 34 together with red R, green G and blue B video data. The data driver 38 latches the red R, green G and blue B digital video data in synchronization with the dot clock DCLK, and then corrects the latched data in accordance with the gamma voltage $V_\gamma$ generated at a gamma voltage generator. The data driver 38 converts the corrected data into analog data to supply the converted data to the data line DL by lines.

The liquid crystal display panel 36 has liquid crystal injected between two glass substrates, and the data lines DL1 to DLn and gate lines GL1 to GLm are formed to cross each other on a lower glass substrate thereof. A TFT formed at an intersection part of the data lines DL1 to DLn and the gate lines GL1 to GLm supplies the data from the data lines DL1 to DLn to the liquid crystal cell Clc in response to the scan pulses. To this end, the gate terminal of the TFT is connected to the gate line GL1 to GLm, the source terminal is connected to the data line DL1 to DLn, and the drain terminal is connected to a pixel electrode of the liquid crystal cell Clc.

Figure 5:
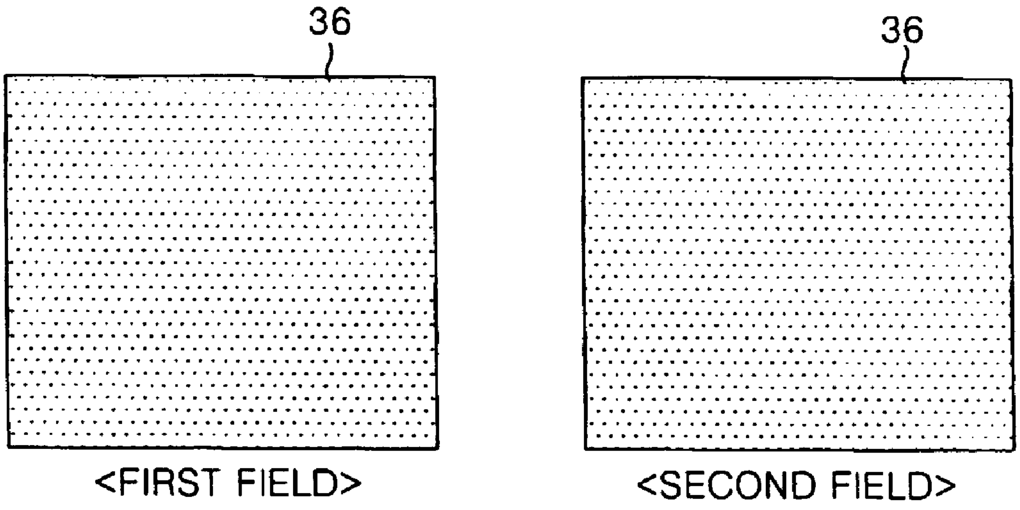
FIG. 5 is a diagram representing first and second fields when driving a liquid crystal display panel of the liquid crystal display according to the present invention in a low speed mode.

A liquid crystal display can be driven in a low-speed mode, high-speed mode or a high picture quality mode. Such modes can be selected by the user through an on-screen display. FIG. 5 is a diagram representing first and second fields when driving a liquid crystal display panel of the liquid crystal display according to the present invention in a low speed mode. The liquid crystal display according to the present invention driven in the low speed mode, as shown in FIG. 5, implements each image as first and second fields, which make up one frame.

When driving in such a low speed mode, if the images are implemented in both the first and second fields, the same brightness can be implemented even with relatively low backlight brightness, which is advantageous in terms of decreasing power consumption. However, the response time of the liquid crystal can be longer than one frame period of a motion picture when driving the liquid crystal display panel in the low speed mode. Thus, a frame frequently changes to the next frame before the voltage charge in the liquid crystal cell reaches a desired voltage. Due to the failure of a liquid crystal cell to reach a desired voltage, motion blurring occurs where the picture of the previous data overlaps the picture of the current data since a picture displayed in the current frame may have moved. In other words, because of the slow response speed in implementing the motion picture, when the data voltage VD is changed from one level to another level, the display brightness BL corresponding thereto will not reach the desired brightness level.

Figure 6:
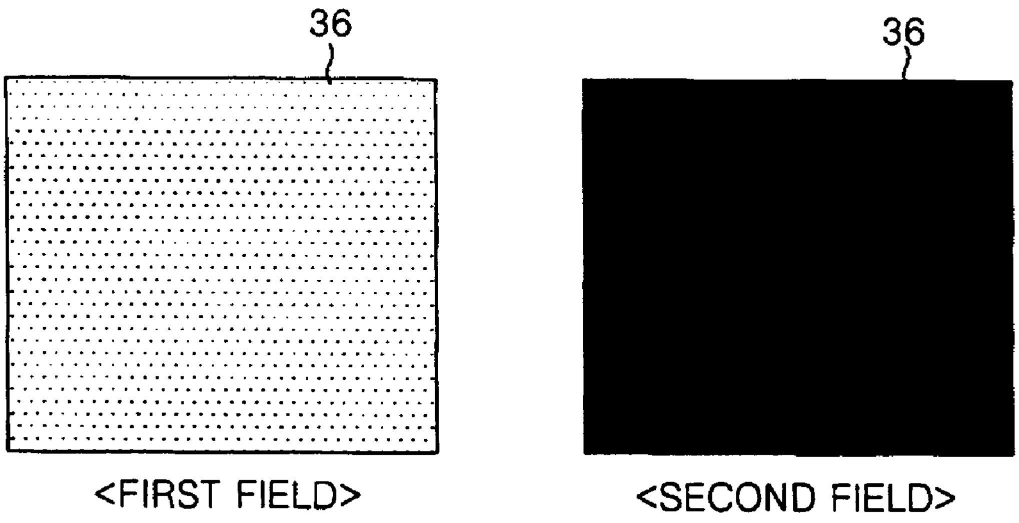
FIG. 6 is a diagram representing first and second fields when driving a liquid crystal display panel of the liquid crystal display according to the present invention in a high-speed mode.

FIG. 6 is a diagram representing first and second fields when driving a liquid crystal display panel of the liquid crystal display according to the present invention in a high-speed mode. The liquid crystal display according to the present invention driven in the high-speed mode, as shown in FIG. 6, implements different data in the first and second fields, which make up one frame. In other words, an image picture is implemented at the first field and a black picture modulated from a picture, which is implemented at the first field, is implemented in the second field. In use of the high speed driving method, the liquid crystal display compensates for the slow response time of the liquid crystals by modulating the data value, to alleviate the motion blurring in the motion picture, so that a picture can be displayed with desired colors and brightness. However, the liquid crystal display driven in the high-speed mode has its displayed brightness reduced to half of the backlight brightness.

Figure 7A:
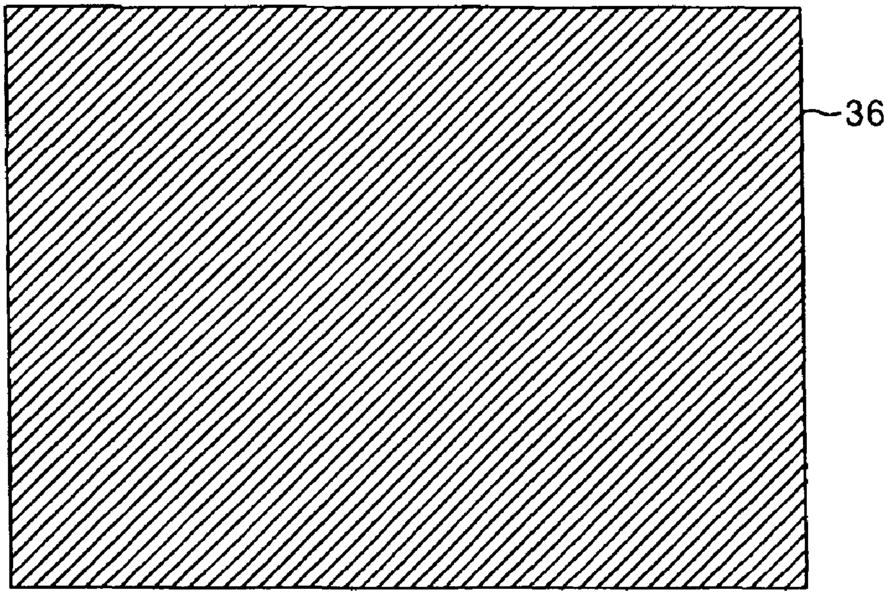
FIGS. 7A to 7C are diagrams representing first and second fields when driving a liquid crystal display panel of the liquid crystal display according to the present invention in the high speed mode and, at the same time, in a high picture quality mode.
Figure 7B:
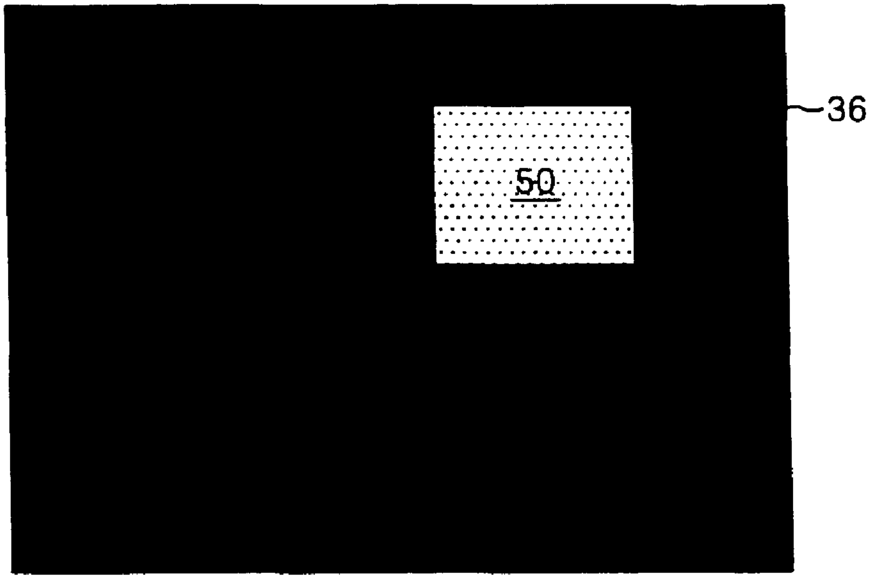
Figure 7C:
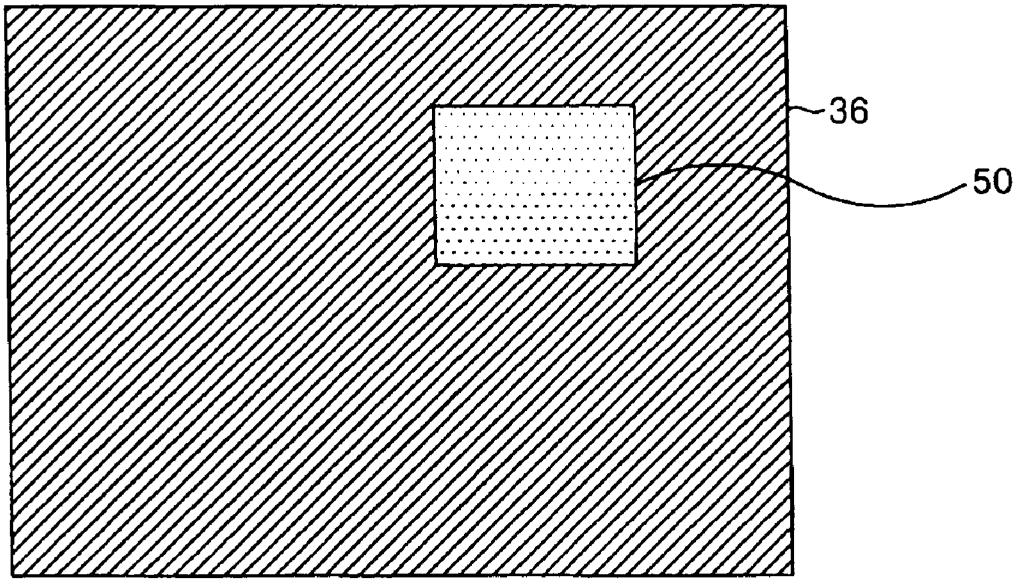

FIGS. 7A to 7C are diagrams representing first and second fields when driving a liquid crystal display panel of the liquid crystal display according to the present invention in the high speed mode and, at the same time, in a high picture quality mode. As shown in FIG. 7A, in the case that the liquid crystal display is driven at a high speed and, at the same time, in the high picture quality mode, the same video signal is applied to the liquid crystal panel at a specific area to be emphasized and to the non-specific area in the first field of one frame. As shown in FIG. 7B, a video signal with different brightness is applied to the liquid crystal cells of the specific area to be emphasized more than the non-specific area. In other words, the black data is applied to the liquid crystal cells of the LCD panel except for the specific area 50. Accordingly, the video with relatively higher brightness 50, as shown in FIG. 7C, is implemented at the specific area as compared with the rest of the LCD panel.

As described above, the liquid crystal display and the driving method thereof according to the present invention controls brightness in a specific area within the video modes by using a video processor and a memory part along with first and second fields for a frame. In other words, the video signal is expressed on the liquid crystal display panel in the first field of one frame, and the video signal is implemented at the specific area and the black picture is implemented at the remaining area in the second field so as to make the specific area appear conspicuous in the liquid crystal display panel. Accordingly, the brightness level appears bright at a specific area of the liquid crystal display panel. The motion picture, the TV video or the image of high picture quality is implemented in the specific area. Further, the liquid crystal display according to the present invention can be driven at double speed since two fields can be used during one frame period.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display, comprising:

a liquid crystal display panel having a liquid crystal cell at each intersection area of gate lines and data lines, which is driven by a frame divided into first and second fields and includes a display area having a specific area and a non-specific area;

an interface part outputting a first data for applying the first data to the display area during the first field;

a video processor outputting a second data for displaying in the specific area and a third data for displaying the non-specific area during the second field, the second data being generated from converting the first data to have different brightness level from the first data;

a memory temporarily storing the second and third data;

a position designator designating the specific area of the liquid crystal display panel where the second data is implemented;

a timing controller realigning the first to third data;

a data driver applying the first data to the display area during the first field, and applying the second data to the specific area and the third data to the non-specific area during the second field; and a gate driver supplying a scan pulse, wherein the second data has different brightness level from the third data, and the third data is a black data, wherein the liquid crystal display panel displays a video signal of the first data in the first field, and then display the second data at the specific area and the third data at the remaining area in the second field, wherein the brightness level of the second data is higher than brightness level of the first data, wherein the position designator designates the specific area in accordance with a program in a computer system, and wherein the liquid crystal display is driven at a high speed and, at the same time, in a high picture quality mode, the video signal is applied to the liquid crystal panel at the specific area and the non-specific area in the first field of one frame.

2. The liquid crystal display according to claim 1, wherein the memory temporarily stores position data for the specific area.

3. The liquid crystal display according to claim 1, wherein the video processor is comprised of a multiplexor.

4. The liquid crystal display according to claim 1, wherein a frame of image data stored in the memory includes at least two fields.

5. The liquid crystal display according to claim 4, wherein each of the two fields correspond to a different brightness level.

6. A liquid crystal display, comprising:

a liquid crystal display panel having a liquid crystal cell at each intersection area of gate lines and data lines, which is driven by a frame divided into first and second fields and includes a display area having a specific area and a non-specific area;

a computer for providing a first data and a position data for the specific area of the liquid crystal display panel;

a video processor outputting a second data for displaying in the specific area and a third data for displaying in the non-specific area during the second field, the second data being generated from converting the first data to have different brightness level from the first data;

a memory temporarily storing the second and third data;

a timing controller realigning the first to third data;

a data driver applying the first data to the display area during the first field, and applying the second data to the specific area and the third data to the non-specific area during the second field; and a gate driver supplying a scan pulse, wherein the second data has different brightness level from the third data, and the third data is a black data, and wherein the liquid crystal display panel displays a video signal of the first data in the first field, and then display the second data at the specific area and the third data at the remaining area in the second field, wherein a frame of image data stored in the memory includes at least two fields, wherein each of the two fields correspond to a different brightness level, and wherein the liquid crystal display is driven at a high speed and, at the same time, in a high picture quality mode, the video signal is applied to the liquid crystal panel at the specific area and the non-specific area in the first field of one frame.

7. The liquid crystal display according to claim 6, wherein the memory temporarily stores position data for the specific area.

8. The liquid crystal display according to claim 6, wherein the memory is connected between the video processor and the timing controller.

9. A driving method of a liquid crystal display, which is driven by a frame divided into first and second fields and includes a display area having a specific area and a non-specific area, comprising the steps of:

providing a first data for displaying the display area;

converting the first data into a second data for displaying in the specific area, the second data having different brightness level from the first data;

generating a third data for displaying in the non-specific area;

applying the first data to the display area during the first field; and applying a second data to the specific area and applying a third data to the non-specific area during the second field, wherein the second data has different brightness level from the third data, and the third data is a black data, wherein the liquid crystal display panel displays a video signal of the first data in the first field, and then display the second data at the specific area and the third data at the remaining area in the second field, wherein the brightness level of the second data is higher than brightness level of the first data, and wherein the liquid crystal display is driven at a high speed and, at the same time, in a high picture quality mode, the video signal is applied to the liquid crystal panel at the specific area and the non-specific area in the first field of one frame.

10. The liquid crystal display according to claim 9, wherein the memory temporarily stores position data for the specific area.

* * * * *